(12) United States Patent
Clime et al.

(10) Patent No.: US 11,071,985 B2
(45) Date of Patent: Jul. 27, 2021

(54) SWIVEL MOUNT FOR CENTRIFUGAL MICROFLUIDIC CHIP

(71) Applicant: National Research Council of Canada, Ottawa (CA)

(72) Inventors: Liviu Clime, Longueuil (CA); Teodor Veres, Montreal (CA); Keith Morton, St-Bruno-de-Montarville (CA)

(73) Assignee: National Research Council of Canada, Ottawa (CA)

( * ) Notice: Subject to any disclaimer, the term of this patent is extended or adjusted under 35 U.S.C. 154(b) by 683 days.

(21) Appl. No.: 15/313,961

(22) PCT Filed: May 26, 2015

(86) PCT No.: PCT/IB2015/053934
§ 371 (c)(1),
(2) Date: Nov. 24, 2016

(87) PCT Pub. No.: WO2015/181725
PCT Pub. Date: Dec. 3, 2015

(65) Prior Publication Data
US 2017/0173589 A1    Jun. 22, 2017

Related U.S. Application Data

(60) Provisional application No. 62/002,984, filed on May 26, 2014.

(51) Int. Cl.
*B01L 9/00* (2006.01)
*B04B 5/04* (2006.01)
*G01N 35/00* (2006.01)

(52) U.S. Cl.
CPC ............ *B01L 9/527* (2013.01); *B04B 5/0407* (2013.01); *B01L 2200/025* (2013.01); *B01L 2400/0409* (2013.01); *G01N 2035/00495* (2013.01)

(58) Field of Classification Search
CPC ............ B01L 9/527; B01L 2400/0409; B01L 2200/025; B04B 5/0407; G01N 2035/00495
(Continued)

(56) References Cited

U.S. PATENT DOCUMENTS 4,776,832 A    10/1988  Martin et al.
4,814,282 A    3/1989   Holen et al.
(Continued)

FOREIGN PATENT DOCUMENTS

JP    2009145111 A    7/2009
WO    2003054513 A2   7/2003
(Continued)

OTHER PUBLICATIONS

International Preliminary Report on Patentabiltiy, dated Sep. 1, 2015.
(Continued)

*Primary Examiner* — Walter D. Griffin
*Assistant Examiner* — Shuyi S. Liu
(74) *Attorney, Agent, or Firm* — Jason E. J. Davis

(57) ABSTRACT

A centrifugal microfluidic chip mounting, kit and method include a swivel joint permitting a chip to rotate about an axis of the chip in a plane swept by a centrifuge, and a force applicator for controlling an angle of the swivel and for applying a force in proportion to a rotational rate of the centrifuge. The mounting includes: a blade part (18) that couples to, or defines, a blade (10) of a centrifuge at a radial distance from a centrifuge axis (12); a chip part (20) that holds the chip at an orientation having a normal not perpendicular to the axis; a one degree of freedom (DoF) joint (16) between the blade part and the chip part; and a force
(Continued)

applicator (28) which bears on the chip part at a fixed set of one or more points, which do not surround, and are not surrounded by, the joint.

21 Claims, 7 Drawing Sheets

(58) Field of Classification Search
USPC .................. 422/72; 356/426, 427; 436/45
See application file for complete search history.

(56) References Cited

U.S. PATENT DOCUMENTS

| | | |
|---|---|---|
| 4,892,708 A | 9/1990 | Wogoman |
| 7,688,449 B2 | 3/2010 | Ogawa et al. |
| 2002/0155590 A1 | 10/2002 | Gebrian et al. |
| 2005/0026301 A1 | 3/2005 | Petithory |
| 2006/0083667 A1 | 4/2006 | Kohara et al. |
| 2010/0086441 A1 | 4/2010 | Lee et al. |
| 2010/0137120 A1 | 6/2010 | Wong et al. |
| 2011/0085949 A1 | 4/2011 | Roy et al. |

FOREIGN PATENT DOCUMENTS

| | | |
|---|---|---|
| WO | 20030083491 A2 | 10/2003 |
| WO | 2011081531 | 7/2011 |
| WO | 2013120190 | 8/2013 |
| WO | 2013003935 | 10/2013 |

OTHER PUBLICATIONS

Kong, et al, A valveless pneumatic fluid transfer technique applied to standard additions on a centrifugal microfluidic platform, Anal. Chem., Dec. 1, 2011; 83(23):9186-90.

Extended European Search Report on Application No. 15800407.7 dated Nov. 17, 2017.

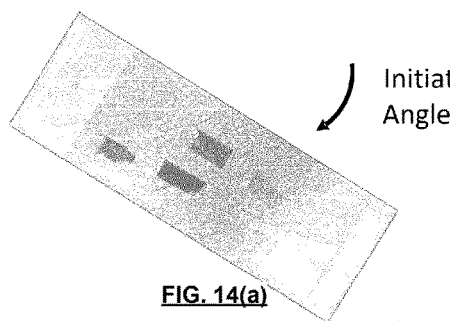
FIG. 14(a)
Initiate Angle
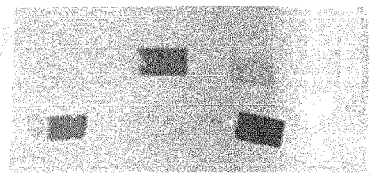
FIG. 15(a)
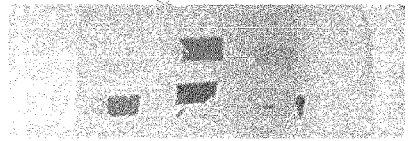
FIG. 14(b)
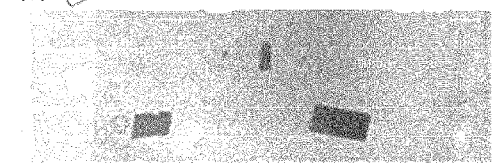
FIG. 15(b)
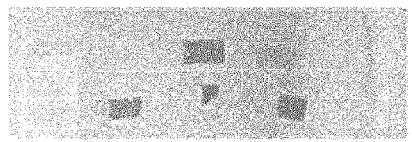
FIG. 14(c)
FIG. 15(c)
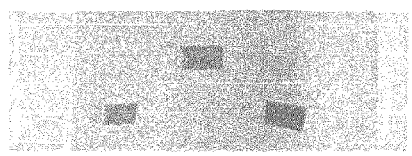
FIG. 14(d)
FIG. 15(d)

SWIVEL MOUNT FOR CENTRIFUGAL MICROFLUIDIC CHIP

CROSS-REFERENCE TO RELATED APPLICATIONS

This application is a national stage entry of International Patent Application PCT/IB2015/053934 filed May 26, 2015 and claims the benefit of United States Provisional Patent Application U.S. Ser. No. 62/002,984 filed May 26, 2014 the content of which is hereby incorporated by reference.

FIELD OF THE INVENTION

The present invention relates in general to centrifugal microfluidic devices, and in particular to a microfluidic chip to centrifuge mounting for coupling the chip to a centrifuge, that includes a free swivel joint permitting the chip to rotate about an axis of the chip in a plane swept by the centrifuge, and a force applicator for controlling an angle of the swivel without surrounding or being surrounded by the joint.

BACKGROUND OF THE INVENTION

Microfluidic chips, such as labs on chip (LOCs), including micro-Total Analysis Systems (µTAS), are increasingly being used for small volume sample testing in a wide variety of fields, such as medicine, pharmaceutical research, food and water analysis, pathogen detection, security, screening, etc. Many processes (filtration, thermal processing, mixing, loading, rinsing, reacting, PCR, crystallization, etc.) have been demonstrated on a variety of substrates for various samples.

A droplet of an aqueous solution (by far the most common fluid used in microfluidics) or an oil, will exhibit surface tension that results in beading. Beading can make it difficult to control movement of the microfluid, as it may stay in a centre of a chamber and not approach a desired exit, and the separation of beads leads to uncoordinated movement of the fluid. Generally the force of gravity is, in itself, insufficient to draw microfluids through microfluidic channels.

It is known to provide walls of the microfluidic channels that are hydrophilic or hydrophobic, as these can improve control of movement of microfluids. This limits materials, adds costs of the treatment to the production of the chips, may preclude some processes or handling of some liquids and, given that such treatments typically last for a limited duration, frequently leads to a host of supply management problems that make such microfluidic chips less commercially attractive. Thus one generally preferred way to control movement of fluids within a microfluidic device is to mount it to a centrifuge. The centrifuge produces an acceleration field that is continuous across the microfluidic chip, and draws the fluid in a predictable way.

There are limited fluid movements that can be performed on the chip by using the prior art centrifugal microfluidics. U.S. Pat. No. 7,688,449 to Ogawa et al. taught processes that involved switching rotational directions of a centrifuge to separate blood from plasma, and to mix reagents with the plasma, and then feed the mixture into a measuring station. While numerous protocols have been developed for centrifugal microfluidics, they generally require a lot of human intervention to accomplish some modestly complicated procedures. It is common to require the chip to be stopped, and for liquids to be administered, a siphon valve to be primed, or for the chip to be re-oriented several times, between periods of centrifugation. An example of this is US 2005/0026301 to Petithory, which particularly points out the advantages of manually rotating the chip about an axis parallel to the axis of the centrifuge, when the chip is at rest.

To overcome some of these steps, onboard actuated (active) flow control devices can be mounted to respective microfluidic channels of the chip. These may be complex, heavy, or inaccurate, and control is provided to only a few channels, which results in limited functionality for the chip. Generally provisioning a chip with an active flow control device to drive fluid in one direction on one channel against the centrifugal field is not cost effective, given the cost of the motor, the added weight to the circuit, and the limited returns avoided by simply requiring the user to stop the chip, prime, or move the chip to a different position, and restart the centrifuge. Costs of single-use chips with embedded motors may be prohibitive, especially in disposable, single-use chips. Other techniques involving applying a burst pressure to a valve, or melting a wax plug have other problems too.

Other techniques involving forces applied at a distance (magnetism, heat, etc.) are known in the art, and have potential applications, where the added expense of equipment and/or weight of the chip and mounting are worth bearing.

Another pragmatically related problem wanting for a solution in this art, is how to effectively lengthen microfluidic chips. As is well known in the art, centrifuges designed to rotate at speeds of 500-1200 Hz have a limited length. The direction of flow is only one way. Even if the chip can be mounted to change angles by only 15° or 45°, a valuable improvement can be made to the utilization of a breadth of the chip, and the range of protocols the chip can provide. The above-identified patent application to Petithory allows for variation of 360°, allowing for sample liquids to cycle around the chip, or reverse a path, according to the actions taken during the periods of rest.

Petithory also teaches that rotation of the carriers that hold their microfluidic chips, can be accomplished by a second motor via a ratchet mechanism, gear box, or other such mechanism, that disengages from the rotor mechanism prior to reapplication of centrifugal force. The mechanism is adapted to rotate the carriers independently or simultaneously to the desired position, when the rotor is at rest.

US 2006/0083667 to Kohara et al. teach a chemical reaction apparatus capable of performing transverse liquid movement in a sample structure, including a mechanism for supporting a reaction device in any position other than at a center of a turntable. Liquid is moved under centrifugal force, and is reversible independently of the turntable. While general microfluidic devices are discussed, the only embodiment shown has only a single flow path between two reservoirs, as shown. Kohara et al. appears to teach that a driver can be used to rotate a microfluidic holder about an axis parallel to that of a centrifuge, while the centrifuge is operating.

While the accuracy of angular positions of such holders and carriers as taught by Petithory and Kohara may leave something to be desired, and feedback control for ensuring accuracy of positioning is not explained for centrifuges in use, the prior art appears to provide some complex machinery for varying an angular orientation of a microfluidic chip in a plane of a centrifuge, during operation of the centrifuge. The weight, complexity, durability, and attendant costs of these devices are high. Specifically, the prior art uses gears or other motors that move a chip holder from a plurality of locations that are disposed symmetrically around the axis of the chip holder.

What is needed for low-cost microfluidic processes are less specialized machinery, microfluidic chips and holders that are readily controlled without heavy, complex, and costly micromachinery, or special-purpose centrifuges.

SUMMARY OF THE INVENTION

Applicant has realized a technique for microfluidic chip to centrifuge mounting, herein a 'swivel mounting' that permits pivoting of the chip in a plane swept by the centrifuge (i.e. at an axis (or set of axes) parallel to, and distant from, an axis of the centrifuge) using a relatively low-cost, and efficient drive. The swivel mounting includes a joint and a force applicator. The force applicator bears on the chip or moving part of the mounting, at one or more locations distant the joint, in that these one or more locations do not form a set of points concentric with the axis (or axes) of the joint. Thus a swivel mounting may provide for only a limited (angular) pivot of the chip, about a pivot axis or axes. The swivel mounting permits the chip to move in exactly one degree of freedom with respect to the centrifuge (i.e. to define a path for the chip with respect to the centrifuge, the path concurrently defining a position and orientation of the chip and any moving part of the mount). For simplicity it may be preferred that the path lies in a plane of the centrifuge (i.e. a normal of the plane is equal to an axis of the centrifuge), although it is perfectly possible to define a three dimensional path for the chip, depending on a space available around the chip in the centrifuge.

Advantages of this setup include the ability to design a lightweight chip mounting that achieves substantial gains in fluidic control without stopping the centrifuge repeatedly, and providing an effectively lengthened chip with the selective control over the angle of pivot throughout a process. Furthermore, the chip may have a plurality of chambers, siphon channels and features that are all affected by the angle of the swivel, so control over the fluid can be exerted in dependence on a position of the fluid by the swivel in multiple ways, unlike a single active flow control device in a single valve.

The joint may be an axial revolute joint, or may comprise two (or more) guided features that are of a fixed spacing to serve as constraints on a relative position and orientation of the two parts coupled by the joint. The features are guided by an arcuate path or guideway, the arcuate path including at least one point having a curvature in the plane of the centrifuge, to constrain the feature at that point to rotate. The features and guideways jointly constrain the movement in position and orientation of the chip with respect to the centrifuge blade. The two or more features may be separated, or may be on opposite sides of a single elongate slider, for example. The features may or may not share one or more guideway or constraint. The joint may be a low friction coupling. The joint may be provided on an articulated blade of the centrifuge, on the chip itself, on a mount between the two, or at any interface between the blade, chip inclusively.

While the features and guideway may form an entirely free and passive joint, by making the guideway of low friction, with each point having a same radius of curvature (i.e. the guideway offering a circular pathway centred on the pivot axis), it may be advantageous to vary the geometry of the guideway, as transitioning between a plurality of such axes (via continuous or discrete steps) will allow centripetal force to be used to push, or resist advance (or retraction) of the chip along the guideway. This may be particularly valuable at junctures where the orientation of the chip is to be changed abruptly. Conversely the guideway, being distant the axis or effective pivot axis, can have some constrictions or regions of higher friction, to intentionally slow traversal of those regions, and as such these constrictions may serve as the force applicator.

While a lever, dashpot, ratchet, or assembly of simple tools may be used to improve control, vary a range of orientations and positions, conditionally lock movement, facilitate measurement, and/or reduce variability of the operation, for example, in some applications, a cost advantage offered by a simplest system is preferred. Therefore a swivel mounting with an axial revolute joint, or one or more arcuate sliding paths that define the pathway that guides the chip in a fixed pivot (and possibly translation) as a function of position along the path, may be a preferred embodiment for the joint.

The swivel mounting is actuated by a (i.e. one or more) force applicator that bears on the chip or holder, and at a distance from the pivot axis/axes. The swivel mounting may be driven by any one or more of: a centripetal acceleration caused by a torque about the pivot axis/axes, air resistance, and an actuator, to control the chip's movement (advance along the path). A distribution of weight supported by the swivel mount (including any mass added for this purpose), with a center of mass that is not collinear with the pivot axis (or span of axes) of the swivel mounting and the centrifuge axis, will ensures that a torque is applied by centrifugation, the torque varying with the centrifuge rate. This mode of driving does not require any force applicator. The other two drivers for the swivel mount requires a force applicator, such as an air foil or drag feature, preferably positioned as far as possible from the pivot axis/axes or an actuator which both involve force applicators.

Thus the force applicator may drive the advance, and/or retraction, along the path. The force applicator may be apply a substantially constant force that is independent of a position along the path, or may provide a force that depends on a position along the path, such as a restorative force provided by an elastic deformation, or a velocity of the moving part of the swivel mount, such as the air foil or drag feature.

The force applicator may simply resist an advance along the path over some section of the path. The force applicator may merely resist centripetally driven advance, and consist of a dashpot, or mechanical resistance, so that the traversal of the path occurs at a selected rate that depends on a centrifuge rate. Such centripetally-based swivel mounting may also include an elastic member that opposes the traversal, for example, to permit the chip to advance, and retreat along the path any number of times during an operation, increasing a variety of protocols and respective chips the system is adapted to support. Such elastic members may include a sensor for reporting a degree of extension.

Naturally, a more sophisticated device than an elastic member can be used, including a small motor, such as a squiggle motor, which can further have advantages in terms of control, measurement, reversibility, and responsiveness. A squiggle motor type driver may also be used in embodiments that are independent of centrifuge rotation rate, i.e. non-centripetally driven. When a torque on the joint is small compared with the force applied by a motor, the swivel mount is driven by something other than inertia/centripetal acceleration. An advantage of using a squiggle motor to move the microfluidic chip, over placing a micromotor in a microfluidic chip (e.g. in channel or in communication therewith via a membrane), is that the one motor can affect opening and closing of a plurality of valves all of once, and the squiggle motor may couple to the mount for reuse without destruction or disassembly from the chip.

While centrifuges generally have the ability to apply a range of angular velocities to microfluidic chips, typically there is little advantage to doing so, as once the centrifugal field exceeds a given value, the micro-confined fluid's trajectory is decided by the structure of the channels in the chip in a relatively short period of time. Applicant has realized a way to leverage the freedom to control an angular disposition of the chip, without having to add substantial bulk to the chip or holder, and without adding substantial costs. The solution involves providing the chip with a swivel mounting to the centrifuge including a force applicator that applies a force in proportion to a rotational rate of the centrifuge. Rotation dependence allows for passive control of the angular disposition of the chip.

A second example of a driver for the swivel mounting that allows for passive control, is an aerodynamic element. A variety of drag, or lift elements could be used alone or in combination with an centripetal driver, or a motor driver. Aerodynamic forces typically vary with a square of velocity, as a result, positioning of aerodynamic elements will preferably be closer to a radial limit of the centrifuge. If air pressure within the centrifuge is insufficient, a fan or jet of air may be provided within the centrifuge, with minimal alteration of the centrifuge.

Further examples of a driver for the swivel mounting is provided by a magnetic field provided within or adjacent the centrifuge race, as by a static or electro-magnet. Thus, a wide variety of drivers for the force applicators are possible. Each may have particular advantages and disadvantages for particular applications.

An exact copy of the current claims are incorporated herein by reference.

Accordingly a microfluidic chip mounting is provided, the mounting comprises
  a blade part of, or for coupling to, a blade of a centrifuge, at a radial distance from an axis of the centrifuge, the blade adapted for mounting to the centrifuge for rotation about the axis, and defining a plane of the centrifuge;
  a chip part for holding a planar microfluidic chip at an orientation having a normal not perpendicular to the axis;
  a one degree of freedom (DoF) joint between the blade part and the chip part, the one DoF joint permitting the chip part to move with respect to the centrifuge blade, the motion including at least a 5° pivot projected onto the plane; and
  a force applicator bearing on the blade part or the axis of the centrifuge at one end, and the chip or chip part at a second end, the bearing on the chip or chip part being provided at a fixed set of one or more points for constraining the motion, where the fixed points do not surround, and are not surrounded by, any instant centre of rotation in the plane.

The motion may be substantially limited to a change in position and orientation of the microfluidic chip within the plane. For example, the motion may be substantially limited to pivoting in the plane.

The joint may be an axial revolute joint, or it may comprise at least two guided features and an arcuate path for the features defining a guideway, where the arcuate path includes at least one point having a curvature contributing to the definition of a pivot axis of the joint. The two or more of the guided features may be separated from each other. Two or more of the features may share one or more constraint defined by the guideway. The motion may involve pivoting of the chip in the plane with the guideway defining two or more curvatures at different sections. The motion may include radial translation of the chip with respect to the axis of the centrifuge, during at least one part of the motion.

The joint may be provided: on a blade of the centrifuge; as a coupler between the chip and the centrifuge blade; or on a mount between the chip and centrifuge blade.

The microfluidic chip mounting may further comprise a lever, ratchet, or assembly of simple tools to limit a multiple degree of freedom joint to the one DOF joint, and/or to define the force applicator.

At one instant during the motion, a centre of mass of the chip part, and the instant centre of rotation, may not be collinear in the projected plane, whereby a centripetal force on of the chip part drives the motion, with a magnitude depending on a rotational rate of the centrifuge.

The chip part may accommodate a rectangular chip, and the motion may include a set of instantaneous positions and orientations for which the length of the chip are generally aligned with the centrifuge blade, and a set of positions and orientations that are generally perpendicular to the centrifuge blade, wherein most extended positions are generally perpendicular to the centrifuge blade.

The force applicator may comprise: a mechanical resistance that slows and controls a rate of the movement; an elastic member for resisting the movement a variable amount depending on an extension of the elastic member; or a small motor, actuable independently of the centrifuge.

Also accordingly, a kit is provided, the kit comprising the microfluidic chip mounting as defined above, and optionally comprising one or more of: instructions for assembling the articulated blade; instructions for assembling the articulated blade from two or more parts of the kit; instructions for assembling the articulated blade from one of a predefined number of centrifuge blades, and one or more parts of the kit; one or more of the chips; instructions for configuring and testing the articulated blade once assembled; instructions for configuring and testing the articulated blade once assembled, and one or more chips or devices for use in configuring and testing the articulated blade once assembled; or instructions for operating the centrifuge in accordance with an established protocol on a given chip with prescribed liquids loaded in respective chambers of the chip, once mounted to the chip part.

A method for controlling an angle of a centrifugal planar microfluidic chip in a plane swept by a centrifuge to which the chip is mounted is also provided. The method comprises:
  providing a chip part mounted to a blade of a centrifuge by a one degree of freedom (DoF) joint so that a chip holder of the chip part is positioned at a radial distance from an axis of the centrifuge, to be swept in a plane of the centrifuge by rotation of the centrifuge about the axis;
  mounting a force applicator to the blade and the chip part for constraining a motion of the chip part relative to the blade;
  placing the chip in the chip holder of the centrifuge so that a center of mass of the chip part, and the axis, are not collinear with any instant centre of rotation of the one DoF joint projected in the plane, and a normal of the chip is not perpendicular to the axis; and
  controlling a rate of centrifuge rotation to vary an instantaneous centripetal force on the chip part provided by the non-alignment of the centre of mass, axis, and instant centre of rotation.

Preferably, the motion is: substantially limited to a change in position and orientation of the microfluidic chip within the plane; or substantially limited to pivoting in the plane.

Preferably, the one DoF joint: is an axial revolute joint; comprises at least two guided features and an arcuate path for the features defining a guideway, where the arcuate path includes at least one point having a curvature contributing to the definition of a pivot axis of the joint; comprises at least two guided features and an arcuate path for the features defining a guideway, where the arcuate path includes at least one point having a curvature contributing to the definition of a pivot axis of the joint, wherein: two or more of the guided features are separated from each other; two or more of the features share one or more constraint defined by the guideway; the motion involves pivoting of the chip in the plane with the guideway defining two or more curvatures at different sections; or the motion includes radial translation of the chip with respect to the axis of the centrifuge, during at least one part of the motion. The one DoF joint may be provided on a blade of the centrifuge; as a coupler between the chip and the centrifuge blade; or on a mount between the chip and centrifuge blade.

The one DoF joint and/or force applicator may further comprise a lever, ratchet, or assembly of simple tools to limit a multiple degree of freedom joint to the one DOF joint, and/or to define the force applicator the one DoF joint.

Preferably, the force applicator comprises: a mechanical resistance that slows and controls a rate of the movement; an elastic member for resisting the movement a variable amount depending on an extension of the elastic member; or a small motor, actuable independently of the centrifuge.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 14 is a schematic illustration of a multi-chamber chip at 4 stages (a, b, c, d) in a process for dispensing and metering a fluid from a chamber numbered 2 into a chamber number 3, in accordance with a method of the present invention;

FIG. 15 is a schematic illustration of a multi-chamber chip at 4 stages (a, b, c, d) in a process for metering and dispensing fluid from a chamber numbered 5 into 6, and then dispensing fluid from a chamber numbered 4 into the chamber 3 to add it to the previously dispensed fluid, in accordance with another method of the present invention.

DESCRIPTION OF PREFERRED EMBODIMENTS

Herein a technique for controlling fluid flow within a microfluidic chip is described. The technique is associated with microfluidic chip mountings, and methods and kits for mounting microfluidic chips. The mounting is adapted to hold a microfluidic chip, and to be secured to a centrifuge, while providing a swivel that permits variation of angular disposition of the chip about one or more axes that are substantially parallel to, and radially offset from, an axis of the centrifuge. The swivel joint includes a one degree of freedom (DoF) joint and a force applicator for constraining the motion, where the fixed set of points do not surround, and are not surrounded by, the joint.

Figure 1A:
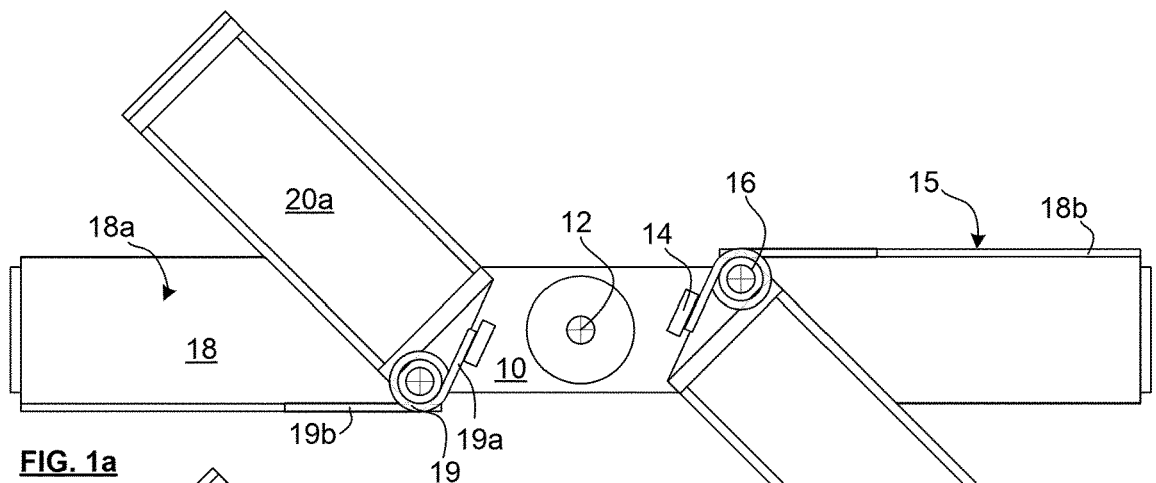
FIG. 1a,b,c are schematic illustrations of three microfluidic chip holders, respectively in which the swivel mounting is provided: within a two-part centrifuge mount; within an articulated centrifugal blade; and as a simple joint coupler for mounting a microfluidic chip to a centrifuge blade.

FIG. 1a,b,c are schematic illustrations of three embodiments of the present invention showing 3 examples of how the swivel can be provided between a microfluidic chip and a blade of a centrifuge. In the first and third embodiments, a same centrifuge blade 10 is used, the blade 10 having an elongated rectangular shape, that is spun on a center axis 12, therefore providing two centrifuge arms. As is well known in the art, longevity of the centrifuge motor is improved by having a balanced set of arms, and the weight of the blades is typically crucial, so lightweight, strong materials are often used to fabricate the blades, which are typically thin. Typically features are provided on each arm for mounting chips to the centrifuge. Each embodiment is shown in a relaxed state, as it would appear prior to or after centrifugation, and has same structures on each arm to define the swivel, although this is not necessary. Once mounted, the distinction between these swivel placements are largely immaterial, as in any case the assembled chip mount produces an articulated chip holder on the centrifuge that has a controlled drive without a heavy motor or drive equipment for tapping energy from the centrifuge.

FIG. 1a shows a particular embodiment of the invention in which a two-part centrifuge mount 15 with a contained joint 16 is provided. An advantage of this embodiment is that it may be relatively easy to design the centrifuge mount 15 for ready attachment (detachably or otherwise) to an intended variety of centrifuge blades, using the variety of mounting techniques known in the art to provide a suitably secure mounting.

The swivel mount is provided within mount 15. Mount 15 has a blade part 18 and a chip part 20. A bottom surface of chip part 20 and top surface 18a of the blade part 18 preferably have a controlled amount of friction. In some embodiments, a lowest friction may be preferred, and may be provided with a lubrication, or self-lubrication plastics. In some embodiments it may be desirable for the chip part 20 to exhibit increased friction at one of a few angles, while providing for low friction away from those angles, to ensure that the chip dwells longer at those few angles if a uniform centrifuge rate is applied, for example, to prime a set of siphons that are primed at those angles. It will be appreciated that such selective resistance can equally be provided by an engineering of the joint 16, or with other features on the mount 15. A side wall 18b is provided in the blade part 18 to prevent the chip part 20 from extending beyond alignment with the blade part 18, although in alternative embodiments the side wall 18b may be removed, and the swivel may be designed to rotate about a larger range.

The chip part 20 has a rectangular recess defined between side walls and a bottom wall for retaining a microfluidic chip of intended dimensions. Chip holding features are schematically illustrated, and can be provided by a variety of known devices, or may be omitted, if a drop of water or an inherent high-friction surface interface between the microfluidic chip and the chip part 20 prevents a soft microfluidic chip surface from moving, for example. The illustrated set of features include sidewalls and top and bottom end walls, which circumscribe a rectangular chip receiving surface 20a.

Figure 2A:
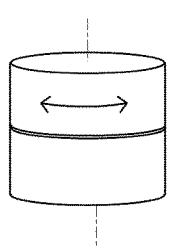
FIG. 2a,b are schematic illustrations of preferred axial revolute joints, having two sections, and three sections, respectively.

The chip and blade parts 20, 18 are connected by joint 16: an axial revolute joint that may have the form shown in FIG. 2a. The joint 16 extends through the chip part at a short distance from the chip receiving area 20a, although many other arrangements of the joint 16 and chip receiving surface can equally be used. This embodiment affords an easy view of the elements of the invention, and it is specifically preferred in some embodiments, to provide a rigid support for the chip along a broad surface, if the chip is susceptible to deformation under the centrifugation. In other embodiments, where a larger surface area of the chip is important, it may be preferred to anchor the chip over a relatively small plan area of the chip.

A force applicator is provided in the form of a looped-wire torsion spring 19, which is fixed to the chip part 20 with arm 19a, and the blade part 18 with the arm 19b. The fixing of the arms to edges of the parts may be provided by clamps, sleeves, or adhesives (not shown). As shown, the force applicator contacts the chip part 20 over a rectangular region that runs tangent to the joint 16. The rectangular region subtends an angle of less than 90° from a fixed axis (herein the swivel axis) of joint 16. A coil loop of the torsion spring 19 loosely surrounds the joint 16 so that the torsion is applied by the force applicator.

One optional feature of FIG. 1a, that may be useful, is a stop 14 that prestresses the torsion spring 19 prior to centrifugation. This allows the chip part 20 to move only once a centripetal force on the chip part 20 overbears the presstress. This may be advantageous for preventing movement of the chip part 20 except during a useful range of accelerations. It will be appreciated that a variety of force applicators can be used to select different forces to be applied at different stages in the movement of the chip part 20 (in orientation or position and orientation) with a single, or with multiple, force applicators.

In some embodiments, the low-friction sliding interface may be provided by suspending chip part 20 so that there is substantially no contact at the interface, whereby the only first order resistance to the pivoting of the chip part is internal to the torsion spring 19, and a negligible resistance internal to the joint 16.

In operation, a loaded chip is placed in the chip receiving area 20a. The chip will be loaded with fluid in a plurality of input ports, which may be located at a top of the chip. The centrifuge is operated with a pre-defined program, or is controlled in response to detected events on the chip. The fluid is drawn by the centrifugal field as constrained by a network of channels within the chip. As the centrifuge is operated, a centre of mass of the chip part 20 and chip (i.e. everything supported by the joint 16) applies a torque on the torsion spring 19, tending to compress the spring, as the center of mass, axis of the centrifuge 12, and joint 16 are not collinear. While a certain minimum centrifugal field is required to consistently draw the fluid, there is typically a wide range of centrifugation rates above the minimum. By operating the centrifuge at rates within this range, an angle of the chip is controlled between a minimum and maximum angle. Depending on a resistance, a variation in mass distribution and inertia, there may be a different amount of hysteresis introduced by a change in centrifugation rate, and accordingly a time may be required for balance to be restored during centrifugation. It may be desirable to establish the actual angle of a system with a given range of loadings at a given sequence of centrifugation rates empirically, and to design optimal operating regimes to achieve a sequence of angles required to perform a protocol, for a given application.

It will be appreciated that in the absence of a limiting feature (such as side wall 18b), a maximum angle is typically decided by a location of centre of mass of the chip part 20 (with the chip and any additional weights that may be added to vary this).

Figure 1B:
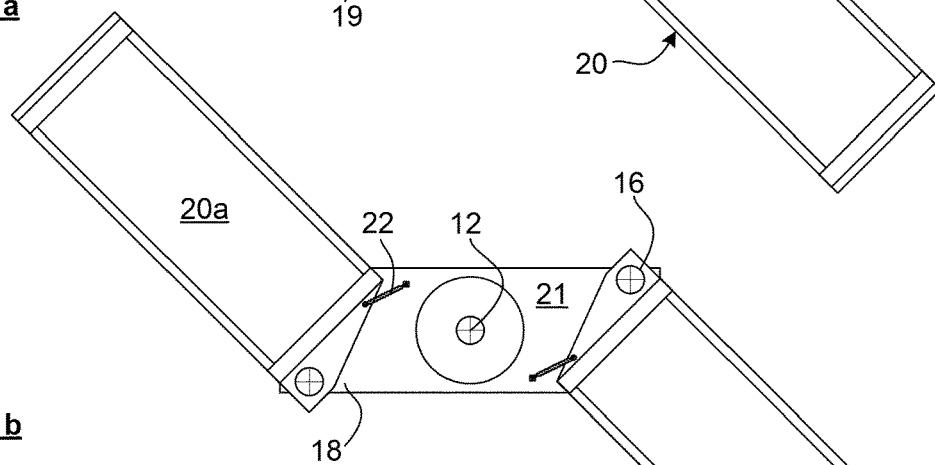

FIG. 1b shows a particular embodiment of the invention in which an articulated centrifuge blade 21 provides the swivel mount. Some centrifuges have replaceable centrifuge blades. It is therefore possible to use an alternative form of blade in these centrifuges. Effectively the articulated blade 21 includes the correspondingly numbered features of FIG. 1a, different in that the blade part 18 is integral with the blade 21, and that side wall 18b and stops 14 are omitted.

The articulated blade 21 has a force applicator in the form of an extensible spring 22 instead of torsional spring 19. The extensible spring 22 is coupled to a blade part 18 of the articulated blade 21 and to the chip part 20. Both of these couplings are effectively at a point, and thus in this embodiment, a small angle is subtended by the attachment to the chip part 20 about the swivel axis.

An advantage of the embodiment of FIG. 1a over that of FIG. 1b is that mount 15 may be designed to couple to a large variety of centrifuges, whereas articulated blades may be only be designed for a more constrained number of centrifuges, and an advantage of the latter embodiment is less weight is added to the blade.

Figure 1C:
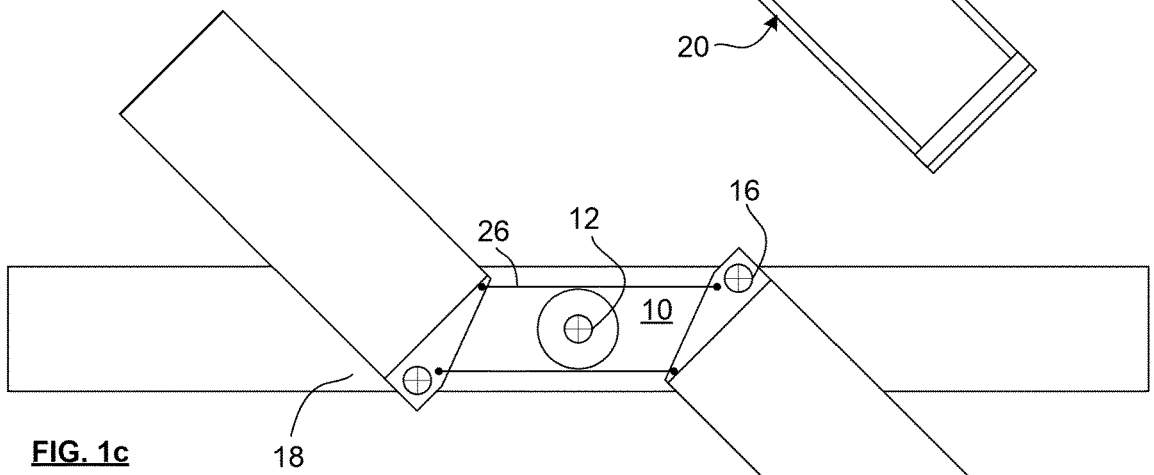

FIG. 1c schematically illustrates a third particular embodiment of the invention. Like reference numerals identify like features, and the descriptions of these are not repeated. In the third embodiment, the whole mount 15 is collapsed to the joint 16, which is attached directly to the blade 10, and to which a chip 25 is mounted. The force applicator is provided in the form of two elastic strings 26. Each elastic string 26 extends from a point on a reference chip 25 (i.e. a point that moves relatively little during operation) to a point on the moved chip 25 that is distant the joint 16 on the moved chip. The two strings 26 are mounted to the corresponding chips 25, which makes it possible to mount both chips directly to correctly placed joints 16 with convenient pressure fit mountings, or the like, without further mounting of the force applicators, and without having to tension or align the strings 26. Advantageously, if one string snaps in use, the other may prevent completely uncoordinated movement of both chips 25, but a change in angles of the chips may show a failure. An advantage of the third embodiment is that a light-weight mount is provided, and works well for self-supporting chips 25.

While the embodiments of FIG. 1 show chips that are initially tilted with respect to the blade (or the blade section of FIG. 1b), and become straighter with acceleration of the centrifuge, it will be appreciated that this could equally be reversed, for example by changing a position of stop 14 in FIG. 1a, and a length or position of the extensible spring 22, or elastic string 26, in FIG. 1b,c.

Figure 2B:
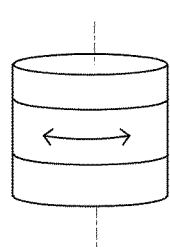

FIG. 2a,b are schematic illustrations of axial revolute joints commonly known in the art. These may have roller bearings, and may have a two part, or three part design as shown. In the embodiment of FIG. 1b it may be particularly inviting to provide two-plane support for a joint 16 such as shown in FIG. 2b, as the mass can be provided at relatively short radius from the center axis, and a stronger, and more resilient bearing is provided.

FIGS. 3a-d are schematic illustrations of guided joints that may be used in alternative embodiments of the invention.

Figure 3A:
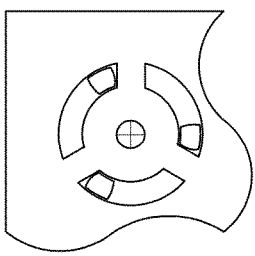
FIG. 3a,b,c,d are schematic illustrations of preferred revolute joints that employ guideways for sliding features, the revolute joints respectively having: 3 guideways; one arcuate guideway with a single axis; one arcuate guideway with two arcuate sections connected by a linear section; and a non-trivial guideway.

FIG. 3a schematically illustrates a revolute joint that consists of three posts in a first part, that extend through three respective slots in a guide piece defined in the second part. The first and second parts may be the blade part and the chip part, or vice versa. The posts may be rigidly connected together above and below the guide piece for greater resilience. The embodiment of FIG. 3a allows for approximately 90° of pivoting. An advantage over the revolute joint of FIG. 3a over that of FIG. 2a is that the force is distributed over larger surfaces, and a possible advantage of the axle-based joint is the unlimited angular range. It will be appreciated that the three slots do not have to have a common radius from the axis. In alternative embodiments, slots may be of different radii from the axis, so that there is more material between the slots, or the load is distributed over a larger surface.

Figure 3B:
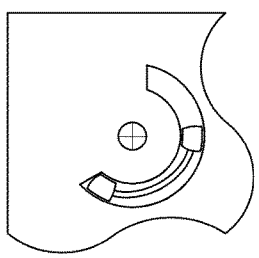

FIG. 3b schematically illustrates a revolute joint that consists of one guideway with two interconnected pillars that form a single slider. This joint has similar angular limitations as that of FIG. 3a.

Figure 3C:
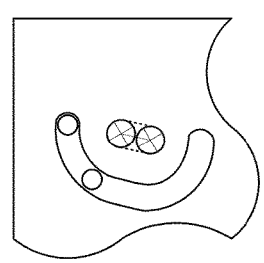

FIG. 3c schematically illustrates a 1 degree of freedom (DoF) joint that includes three steps: revolution about two axes, and sliding between the two short revolutions. It will be appreciated that allowing the chip to slide radially outwardly may impart momentum to the chip part, to ensure prompt advance. It will be appreciated that using this freedom comes at an expense of the length of the chip available for the microfluidics, and therefore may limit the amount of features on the chip. The pivoting of the chip may allow for a longer effective length of the chip, and if not, may still provide for gating, or valving functions that may be necessary to accomplish some protocols. The illustrated 1 DoF joint is shown at an initial (retracted) position if the posts are fixed with the chip, and in a fully extended position if the guideway is fixed with the chip.

Figure 3D:
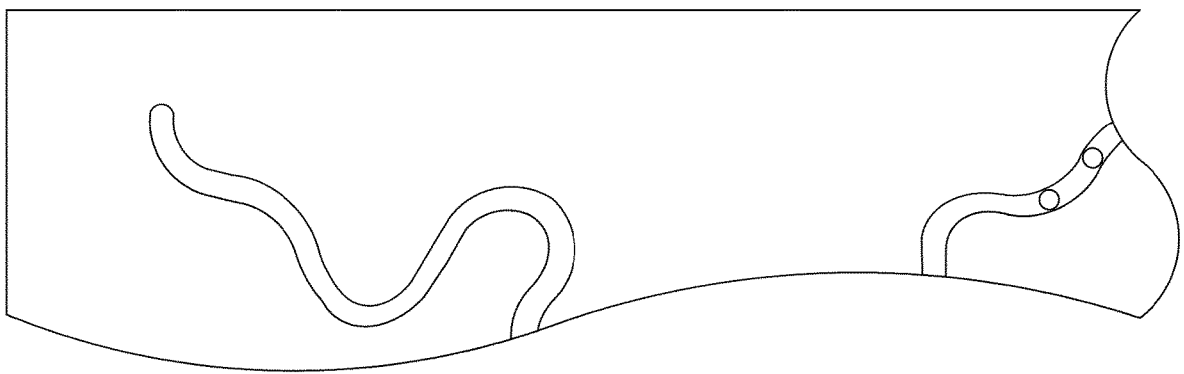

FIG. 3d schematically illustrates a more complicated 1 DoF joint that allows for a number of changes in angle. In general it may be advantageous to keep a chip substantially perpendicular to the blade for lowest centrifuge rates, to have it gradually move to an orientation substantially parallel to the blade at higher rates, followed by a most extended part of the motion where it is oriented perpendicular to the blade again (the same or opposite orientation as the least extended), so that the full length of the chip is used, but never extends radially outwardly of the centrifuge beyond an established limit.

Figure 4:
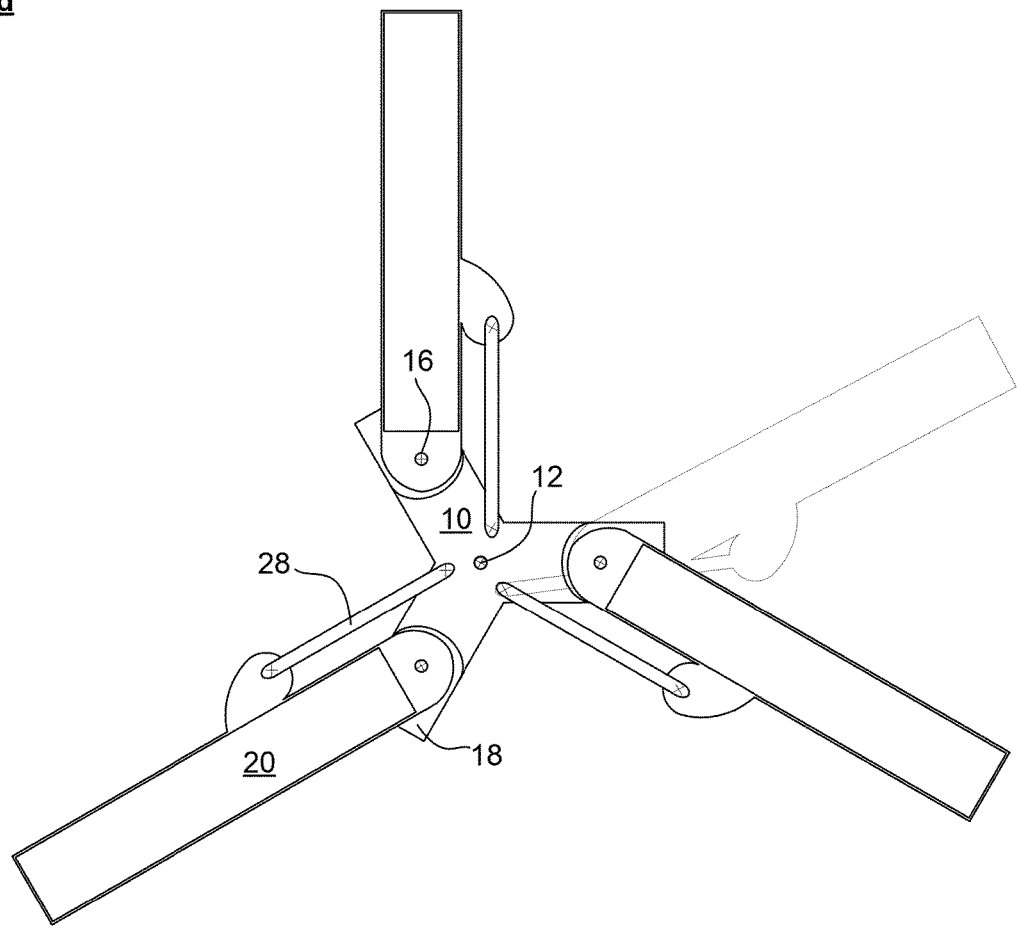
FIG. 4 is a schematic illustration of an embodiment having 3 centrifugal arms.

FIG. 4 schematically illustrates a fourth particular embodiment comprising a non-even number of centrifuge blades (3). It will be appreciated that any number of blades can be provided, subject to the space available of the centrifuge, and an angular extent of the motion of the chip. It is generally preferred to balance the mass distribution around the centrifuge, which is often performed by providing multiple blades (often two or four), although it may also be provided with masses closer to the center axis. The fourth embodiment includes dashpots 28 as force applicators. In such embodiments, control can be exerted to slow the descent from a higher potential energy to a lower one, but no restorative force is applied, and accordingly slowing the rate of the centrifuge results in a slowed rate of advance. The dashpots may be designed to apply a different resistance as a function of extension, to ensure that, at some angles, the swiveling of the chip parts are impeded, and not as much at other angles. This can allow for improved control over the advance of the swivel throughout an operation, and allowing for coarser control over the revolution rate to effect a given desired predetermined movement of the chip.

Figure 5A:
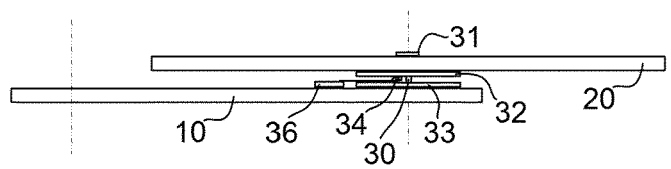
FIG. 5a,b are side and top plan views of a non-centripetally driven, microfluidic chip holder.
Figure 5B:
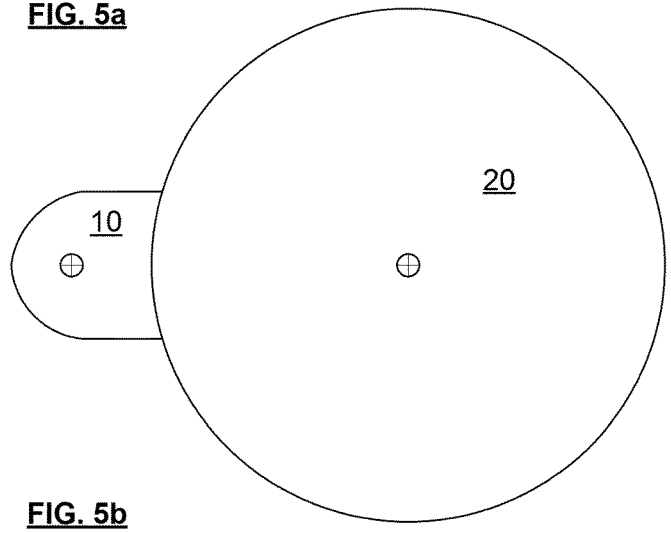

FIG. 5a,b are schematic side elevation and plan views of a fifth particular embodiment of the present invention. The blade 10 is spun at one end and the chip is rotated about a center axis, unlike the previous examples. A disk-shaped chip part 20 is provided for supporting a microfluidic chip. The chip part 20 is mounted by an axial revolute joint, which has an axle 30, a cap 31, and one friction pad 32 for meeting the chip part 20, and another friction pad 33 for meeting the blade 10. A small motor 34, such as a squiggle motor, or a motor based on piezoelectric, electroactive polymeric, shape memory alloy, or like smart material assemblages is provided that grips the friction pads 32,33 in a low clearance space between the two. As the axle 30 is thin, the small motor 34 can grab the friction pad 32 of the movable chip part 20 close to its centre. Geometrically speaking, a 5 mm displacement of the small motor 34 can produce a 90° pivot movement of the chip part 20 if the motor 34 grabs the friction pad 32 at a radius of less than 5 mm from the swivel axis. A controller 36 is provided, for example, for driving the motor 34 in accordance with program instructions and/or communications with an external controller, to perform a protocol for a microfluidic chip. In some embodiments position feedback sensor data, or sensor data pertaining to a monitored flow of fluid in the microfluidic chip, may be received at the controller 36.

One advantage of the fifth embodiment is a possibility to track an angular position of the chip part 20 during a procedure, for example using sensor data, or feedback from the motor 34, or from the signaling sent to drive or control the motor 34. This may be particularly advantageous when a centrifuge does not have a stroboscope and viewer allowing for visualization of the fluid movement within the chip.

Figure 6:
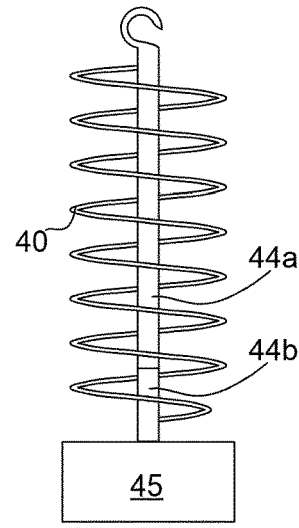
FIG. 6 is a schematic illustration of an instrumented spring for use as a force applicator.

FIG. 6 is a schematic illustration of another technique for monitoring a degree of extension of a force applicator, applicable to a piston or a spring 40 (as shown). The technique involves an instrumented force applicator, which includes a displacement measurement device, which allows for negligibly resisted movement between a telescopic joint defined between inner sleeve 44a and outer sieve 44b. An electrical resistance, or other property of a measurement obtained that depends on a degree of the extension is then used to output a signal indicative of the displacement, and therewith, an angle of the chip with respect to the blade. The measurement may be made by an autonomous electric circuit with a communications function and power supply in controller 45. It will be appreciated that a wide variety of goniometers, laser-based interferometric systems (e.g. having a retroreflector or mirror on the chip holder for ranging from a static position on a periphery of the centrifuge) or other sensors could be used, including stroboscopic imaging of the centrifuge, with image analysis software.

Figure 7:
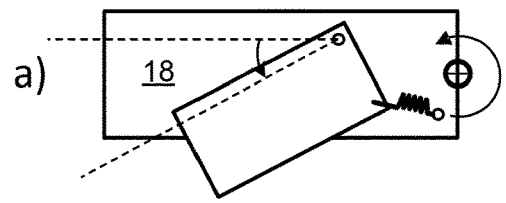
FIG. 7 is a schematic illustration of a centripetally driven swivel mounting at four steps.
Figure 7:
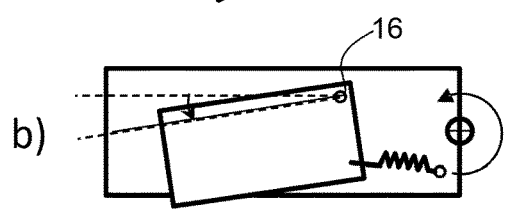
Figure 7:
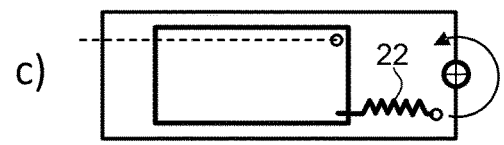
Figure 7:
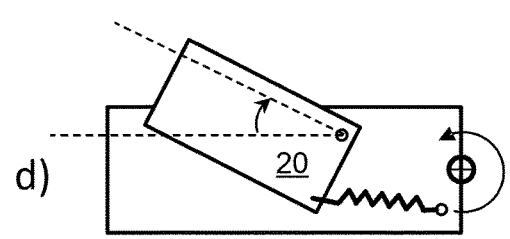

FIG. 7 schematically illustrates a sequence of steps in operating a centripetally-driven microfluidic chip mounting that uses a spring 22 as a force applicator. The mounting has a chip part 20 mounted by an axial revolute joint 16 at a top left corner, and by the spring 22 at a top right corner.

Step a) shows an angle of the chip part 20 prior to centrifugation. While the illustrated embodiment shows a relaxed spring in a) making an angle of negative 28°, it may be advantageous to provide a higher minimum tension for the spring, as can be provided with a spring that is collinear with the axial revolute joint in a most relaxed position. Such an arrangement reduces an angular variation between step a) and b), and provides a wider range of angles over which the angle can vary by changing a rate of centrifugation.

Step b) shows a position of the chip part 20 at a minimum centrifugation rate. This position is a minimum extension limit (about −9°, as shown) of an angular range over which the chip part 20 varies. It will be appreciated that this limit may be imposed by a minimum centrifugation rate of the centrifuge, or may be a somewhat arbitrary rate chosen for satisfactory movement of the fluid. Step d) shows a position of maximum extension: 26°. This position may be determined by a maximum centrifugation rate of the centrifuge, by a burst pressure of the chip, and the angle is always affected by a position of the centre of mass of the chip part 20. The closer the centre of mass of the chip is to the spring 22, the greater a force is applied by the centrifuge. Step c) shows an intermediate step where the chip part 20 is aligned with the blade part 18. This position is a reference 0° angle. By varying the centrifuge rate, the chip part 20 can be changed between angles from −9° to 26°. A wide variety of chips and protocols can be designed with such a range in mind.

Figure 8:
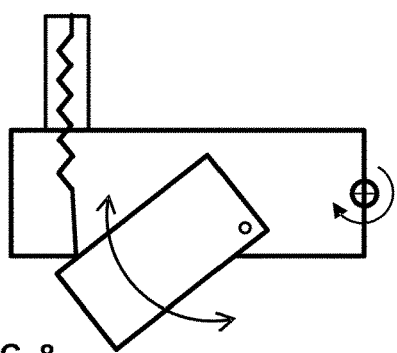
FIG. 8 is a schematic illustration of a swivel mounting using an initially compressive force applicator.

FIG. 8 schematically illustrates a sixth particular embodiment of the present invention. In the sixth embodiment, the force applicator is a compression spring, and bears on the chip part near a bottom of the chip.

Figure 9:
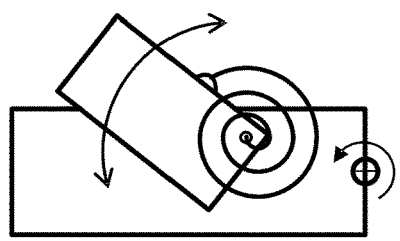
FIG. 9 is a schematic illustration of a swivel mounting using an initially tensile force applicator.

FIG. 9 is a schematic illustration of a seventh particular embodiment of the present invention. The force applicator in the seventh embodiment is a planar spiral spring, which bears on a side of the chip part at two points, whereby a force applied by the planar spiral spring.

Figure 10A:
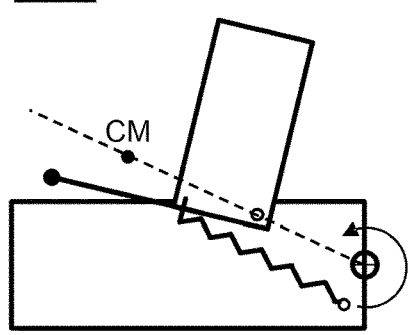
FIG. 10a,b are schematic illustrations of a centripetally-driven swivel mounting having an initial parallel orientation, and an extended position perpendicular to the centrifuge blade, wherein a mass is mounted transversely from the chip axis, to vary a center of mass.
Figure 10B:
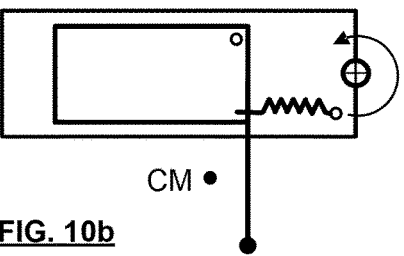

FIG. 10a,b are schematic illustrations of how a mass can be added to increase an angular range of the chip part. By displacing the centre of mass, with the addition of a mass on an extended arm, the range of the chip can be extended. FIG. 10a shows an initial (relaxed) position where the chip part has a 0° angle, and a theoretically greatest angle achievable (where the spring force is considered negligible compared with the centripetal force) of about 103°.

Figure 11:
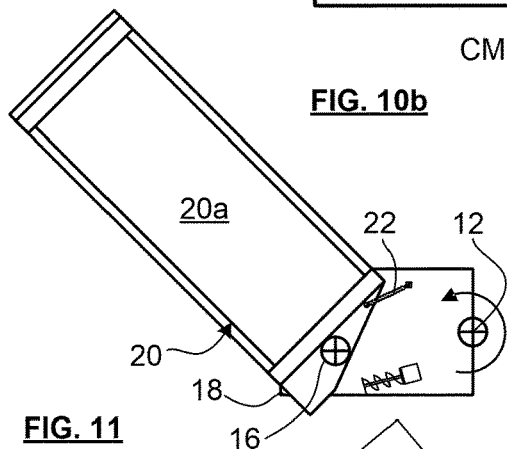
FIG. 11 is a schematic illustration of a swivel mounting with primary and secondary force actuators.

FIG. 11 is a schematic illustration of an embodiment in which two force applicators are used to provide a two phase application of force. Specifically an embodiment as shown in FIG. 1b is modified so that the joint 16 has its swivel axis closer to a centre line of the blade, which results in more movement of a square corner of the chip part 20 nearest the center axis. As a result of the position of the swivel axis, once the chip part 20 is extended substantially, the square corner will engage a push end of the second force applicator, which may be a piston or a spring, and may be instrumented. It will be appreciated that there are a wide number of other possible arrangements for multiple force applicators that will have advantages and disadvantages in respective embodiments.

Figure 12:
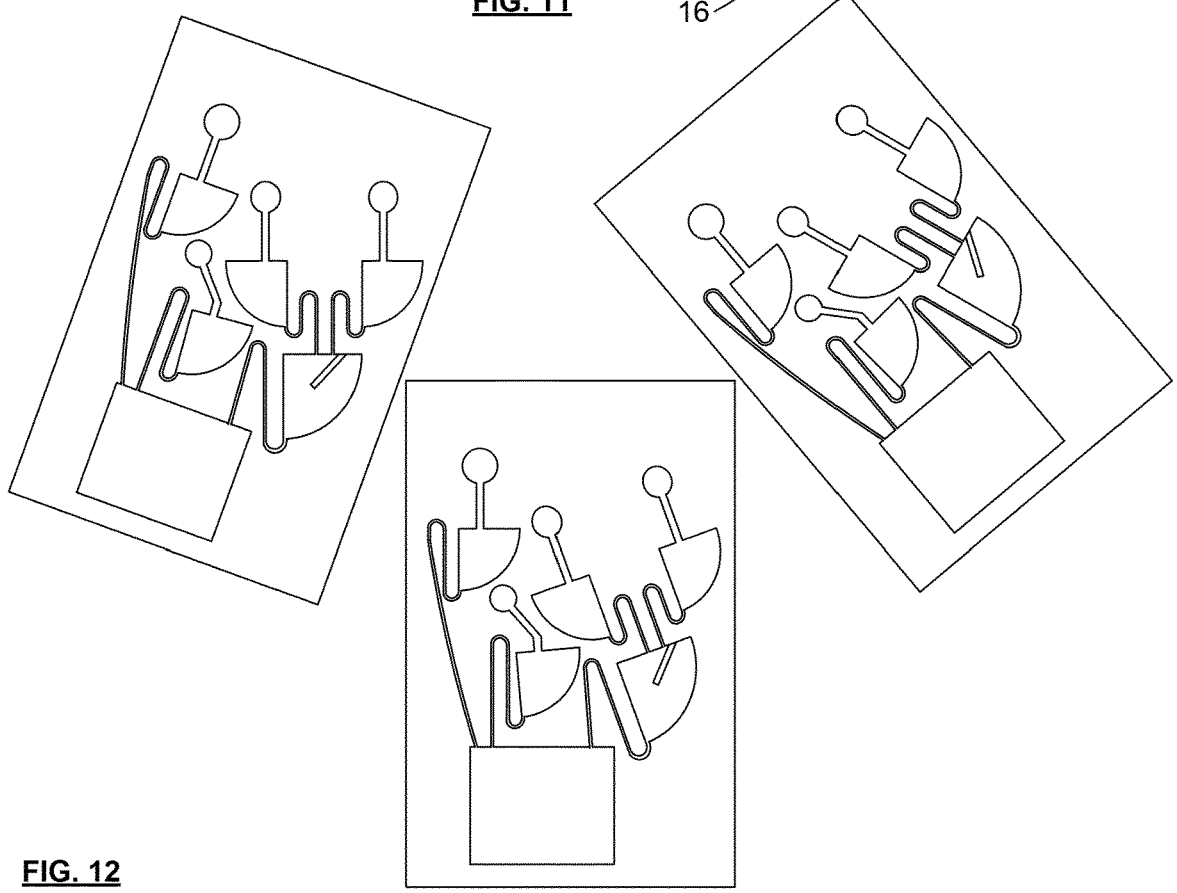
FIG. 12 is a schematic illustration of a microfluidic chip with siphon valves for which tilting permits control of microfluidic valving.

FIG. 12 schematically illustrates a microfluidic chip 25 tilted at three angles: negative 20°, 0°, and 40°. The chip 25 has 6 reservoirs. The top 5 reservoirs are shaped so that an egress is at a lowest point, although this is not essential. At the negative 20° angle, two fully filled top right reservoirs would be disposed for priming. Centrifugation at a constant rate for a prescribed period will allow these two reservoirs to dispense fluid into the bottom right reservoir. No other valve would be in a position to be primed. These two top right reservoirs could be filled to a prescribed volume in any manner known in the art, including using the metering and delivery method taught by Applicant in co-pending WO 2013/003935. As will be evident to the person of ordinary skill, the fluid volume in the reservoirs materially affects whether a chamber is in a position to be siphoned. The metering method of WO 2013/003935 will advantageously allow for control over the volume delivered into these chambers, although that is not shown. The bottom right reservoir is a microfluidic mixing chamber, according to the teachings of Applicant's PCT/CA2013/000139. Once the mixing of the two fluids is provided, the chip may be moved to a position intermediate the 0° and 40° positions. It will be noted that fully filled chambers in all of the chambers are in a position to be primed and removed at the 40° position, and that each of the chambers has a respective threshold angle between the 0° and 40° positions at which it will prime.

There are a very wide variety of protocols that can be provided using the present invention. For example, applications in biotechnology, rapid clinical diagnostics, food safety testing and pharmaceutical industries involve the sampling and study of biological targets including proteins, DNA, viruses, bacteria, parasites, and cells. Protocols typically involve aliquot handling through a series of process steps including sample preparation, filtering, mixing, labelling, incubation, washing, immobilization and analysis; each step requires multiple liquid handling sequences and reactions between biological entities and reagents wherein volumes are moved, mixed or held in place for incubation for a time or until a such as time as they are needed. The present invention is able manage simply these sequential process at specific time intervals while holding other reaction volumes stationary until they are required.

Example: 1

An example of a centripetally operated swivel mount designed with two chip holders coupled by springs, is imaged in FIG. 13. FIGS. 13a-c show the swivel mount having a mass of 50 g mounted on a supporting plate by an axial revolute joint. The two identical coil springs between the chip parts had elastic constant k=83 N/m. FIG. 13a corresponds to a relaxed state of the swivel mount (angle −26°), while b and c show tensioned springs for 0° and 30° rotation angle respectively.

The swivel mount is formed of a base plate, which is required to support the axial revolute joint, and provides a throughbore for mounting to the centrifuge. The base plate has additional features that provide visual cues for identifying the angular disposition of the chip part, and permits additional chips to be mounted to the base plate. The joints each couple a respective chip part to the base plate, and the two chip parts are coupled by two coil springs. The fabrication of the base plate and chip parts was performed by additive 3D printing.

Figure 13A:
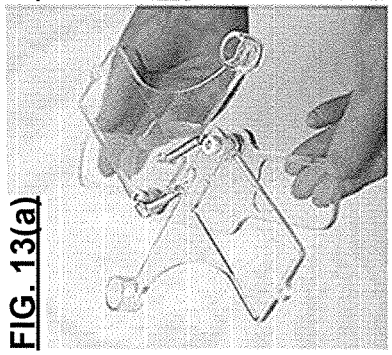
FIG. 13a, b, and c, are three photographs of a prototype showing spring-based mounting of two chip holders with spring couplings from chip part to chip part as in FIG. 1c, with a holder for an additional transversely mounted mass, as in FIG. 10, in each of three states of extension.
Figure 13B:
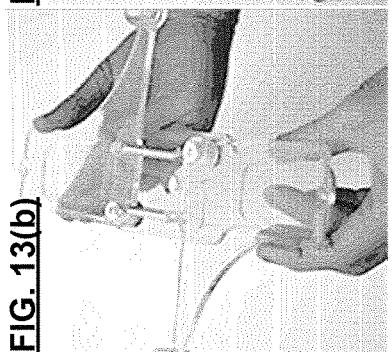
FIG. 13d is a graph showing angular extension of the embodiment of FIG. 13a-c, as a function of centrifuge rate, illustrating centripetally-controlled angular actuation of a microfluidic chip.
FIG. 13e schematically illustrates a chip outline of a chip having multiple siphon chambers some of which being actuable by varying angular disposition of the chip, and a photograph of the prototype of FIGS. 13a-c with such a chip mounted thereto.
Figure 13C:
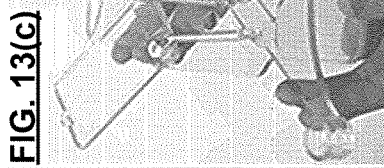
Figure 13D:
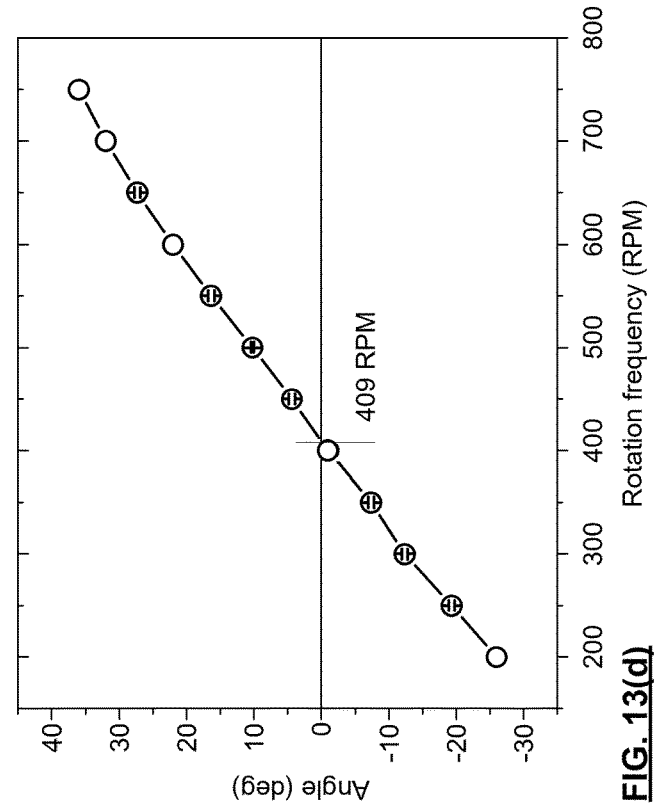

FIG. 13d shows the calibration curve obtained for the above swivel mount with no mass in the holder. Measurements of this calibration curve with microfluidic chip loads up to 30 g of mass show practically no difference with respect to the curve in FIG. 13d, and accordingly this device shows good reproducibility for operation at various angles that depend on rotational rate. A considerable advantage of using a spring as a force applicator, is that the path of extension from the initial position to a fully extended position is reversible. That is, the 12 different measurement points corresponding to about 5° intervals between −26° and 34° can be chosen in any order, with minimal durations at intermediate angles, for chosen sequences. We have observed that the same RPMs result in the same angular disposition after a short movement period (about 1 s for full range) regardless of whether the angle is approached by a deceleration or acceleration of the centrifuge. By convention the angle in the relaxed state of the blade is taken to be negative.

Throughout these operations no mass was placed in the holder that extends to a left of the chip part of the swivel mounts, as the mass of the plastic was sufficient. It will be appreciated, that faster compliance can be obtained, and generally a smaller difference in centrifugation rates can effect a same change in angular disposition, if a greater weight is provided in the mass holder. Furthermore a range of angles is varied by the introduction of masses.

Figure 13E:
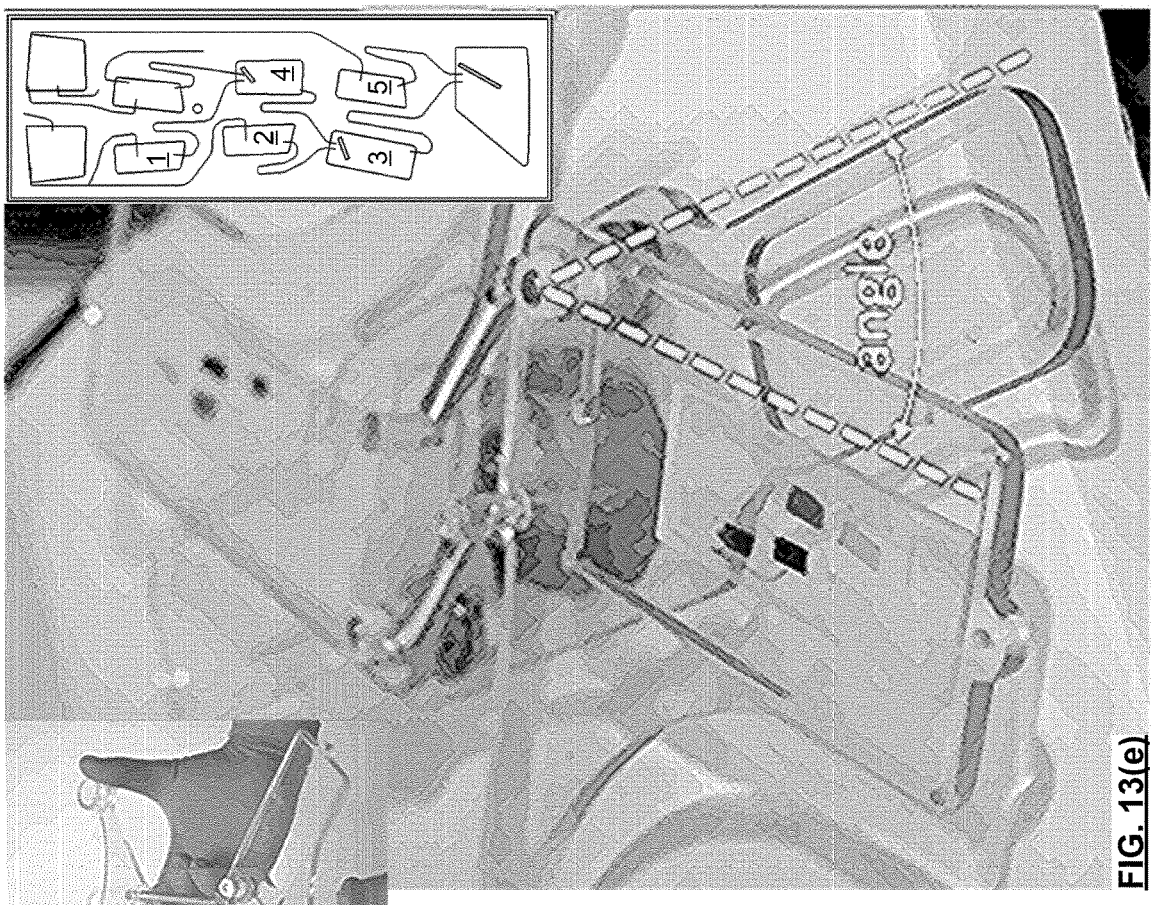

A microfluidic chip mounted on the swivel mount is shown in FIG. 13e (schematics of the fluidic circuitry is shown in the inset). The salient features of the design are the siphons linking the reservoirs 2 and 3, 4 and 3 and 5 and 6. This was produced from a film of thermoplastic elastomer (specifically, Mediprene OF 400M) that was surface patterned by hot embossing against a mold. The film was applied to a substantially harder Zeonor layer to form a hermetic seal, as per the teachings of Applicant's co-pending US 2011-0085949. The inset on the top right of FIG. 13e affords a better view of the patterning of the chip. One can see here a plurality of chambers, including several that were filled.

A size of the chip part shown in greater detail in FIG. 13e is large enough to support two chips side-by-side. Only one is shown for clarity of illustration. Attachment of the chips has been satisfactory relying only on the friction between the mediprene side of the chip to the chip part, and a raised edge of the chip part that surrounds the chip, although Applicant has also used a clamping mechanism to retain chips in other experiments. Applicant has further stacked a Mediprene side of the chip to a Zeonor side of a bottom chip, to mount two chips vertically. The limits to how many such chips may be stacked for concurrent processing is expected to be limited by the clamping technique used, mass, and dimensions surrounding the centrifuge.

To illustrate the principle of the approach, chambers identified as 1, 2, 4 and 5 were initially filled with different coloured liquids and the chip mounted on the swivel mount (FIG. 13e). In FIG. 14 shows photographs of the liquid transfer obtained by changing the rotation rate of the platform. From stable equilibrium at negative orientation, in FIG. 14a, the rotation rate is increased to 400 RPM, and held constant for a priming duration, which in the present case was nearly instantaneous. It will be appreciated that by varying a priming duration (e.g. with the introduction of fluid resistances), further flexibilities in an order of dispensing for different chip protocols, can be achieved. Once the rotatation speed was increased to 400 RPM, the transfer from chamber 2 to chamber 3 was initiated, and will follow regardless of the angle of the chip. It took about 7 s for the chamber to dispense in this example, and 3 images were taken.

FIG. 15a shows the chip in the same state as in FIG. 14d. Subsequent increase of the centrifuge rate to 500 RPM dispensed the metered fluid in chamber 5 into chamber 6, without affecting fluid in any other chambers. Once the 500 RPM rate was met, and the siphon chamber 5 primed, the rotation rate was slowed again to a 0° angular disposition of the chip. FIG. 15b shows the chip with the fluid in chamber 5 moved into chamber 6. The centrifugation rate was then increased to 600 RPM to prime reservoir 4, initiating transfer of its content to 3 as shown in FIG. 15 a-d. In a similar manner, reservoir 5 is then emptied into 6 (not shown here). Throughout this process, chamber 1 is not affected, showing that appropriate orientation of the siphon angles allows for selective dispensation of some chambers without dispensing other valves.

Figure 16A:
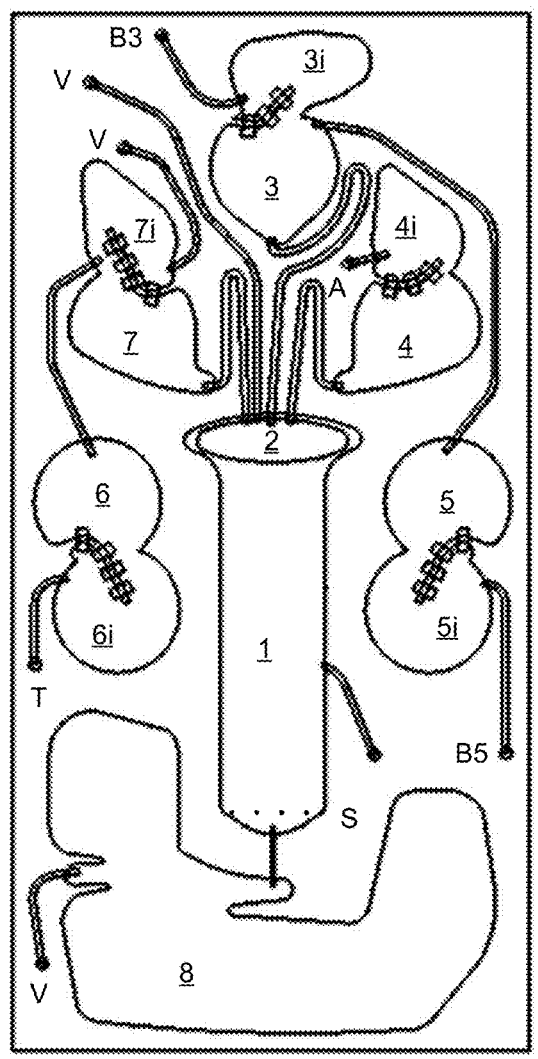
FIG. 16A is a schematic top view representation and FIG. 16B is a photograph, of a microfluidic cartridge and its components used in a colorimetric hybridization assay (CHAS) chip.
Figure 16B:
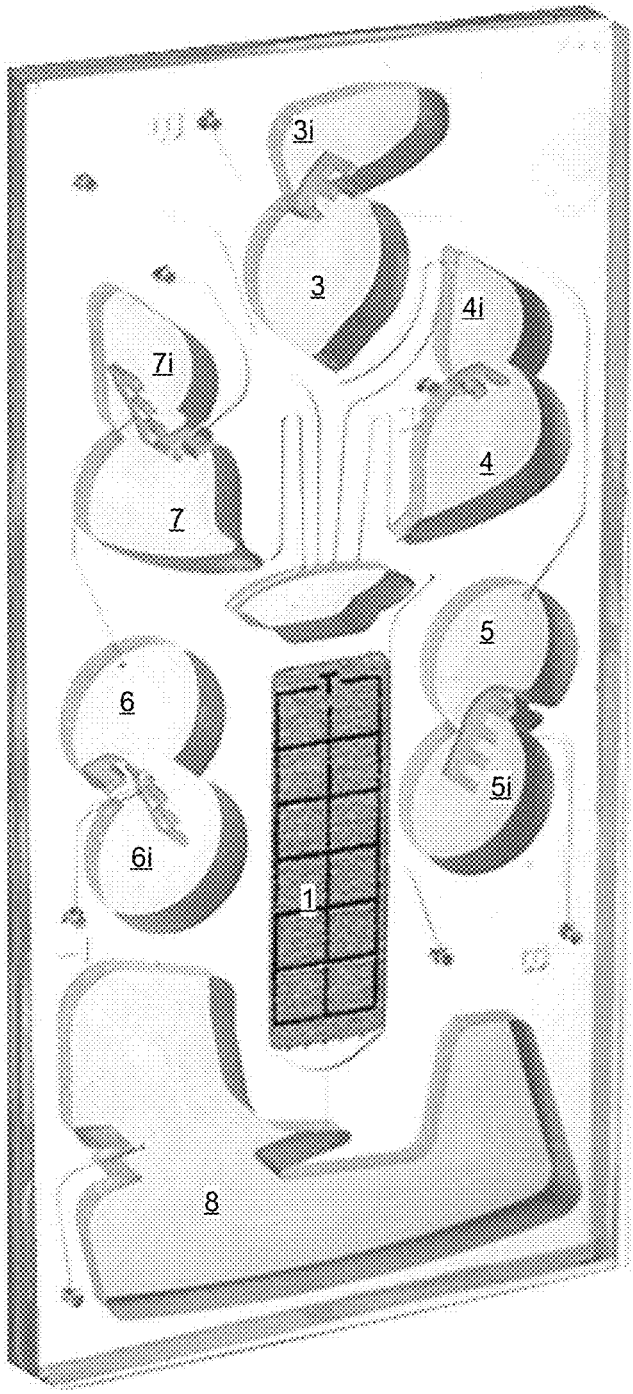

FIG. 16 shows a top view schematic representation (a) and a photograph (b) of the microfluidic cartridge and its components used in a colorimetric hybridization assay (CHAS) and manipulated with a centrifugal platform based on an embodiment such as that of FIGS. 5a,b that provides a large tilt angle, non-centripetally driven, swivel mounting.

Compartments 1 and 2 are hybridization units; compartments 3-7 are storage and transfer compartments; and compartment 8 is a waste reservoir. Access ports are labelled as follows: (A) antibody solution; (B) buffer for wash steps; (S) sample; (T) TMB membrane peroxidase substrate, and (V) vents. Orientation of the centrifugal field with respect to the microfluidic cartridge is indicated at the left by the vertical arrow. The sensing biological elements (functionalized cloth) are inserted into compartments 1, 2 and the actual detection reaction takes place. The cloth chamber (1) is preceded upstream by a buffer chamber (2) that allows for liquid to accumulate before flowing through the cloth, in order to ensure a continuous bubble-free filling of the cloth. Compartments 3, 4, 5 and 6 are pre-loaded through ports B3, A, B5, T with specific reactive solutions (respectively, first wash buffer, antibody, second wash buffer and tetramethylbenzidine buffer) while the sample is injected directly in the hybridization chamber through the port S, properly sealed afterwards. Additional pillar structures labelled a 3i, 4i, 5i, $6i$ and $7i$ are used to hold liquids at pre-defined locations in these chambers when the reactive solutions are loaded to the chip. Some auxiliary vent holes and connecting channels (labeled as V on FIG. 16A) ensure proper circulation of liquids in the microfluidic circuit. Liquids from chambers 3 and 7 are triggered by a clockwise rotation of the secondary axis. Liquid in compartment 4 is triggered by a counter-clockwise rotation. Liquids from 5 and 6 are transferred to the reaction chamber in two steps: (i) a 180 degree flip to move liquids into the reservoirs 3 and 7 and then (ii) angular actuations of the siphons connected to 3 and 7 at a small and large angle, respectively. All liquids are collected in the waste chamber 8 at the end of the reaction.

While this embodiment used only priming of reservoirs at successively higher angles of disposition, it will be appreciated that it is clearly possible to require a longer priming durations at shorter angles of disposition, that would allow for quick priming of higher angle of disposition siphons, such that all lower angle of disposition siphons will not be primed by the time that the higher angle of disposition siphons is primed, which would allow for complete freedom to select which siphon to dispense first, at the cost of slower response times for lower angle of disposition siphons.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A microfluidic chip mounting comprising:
   a blade part of, or for coupling to, a blade of a centrifuge, the blade adapted for mounting to the centrifuge for rotation about an axis of the centrifuge, and defining a plane of the centrifuge;
   a chip part for holding a planar microfluidic chip;
   a one degree of freedom (DoF) joint between the blade part and the chip part, the one DoF joint permitting the chip part to move with respect to the centrifuge blade, the motion including at least a 5° pivot projected onto the plane, the motion having an instant centre of rotation separated from the centrifuge axis by a radial distance; and
   a force applicator bearing on the blade part or a rotary part of the centrifuge at one end, and the chip or chip part at a second end, the bearing on the chip or chip part being provided at a fixed set of one or more points for constraining the motion, where the fixed point(s) is/are not concentric with any instant centre of rotation of the pivot motion in the plane.

2. The microfluidic chip mounting of claim 1 wherein the motion is substantially limited to a change in position and orientation of the microfluidic chip within the plane.

3. The microfluidic chip mounting of claim 1 wherein: the motion is substantially limited to pivoting in the plane; or the joint is an axial revolute joint.

4. The microfluidic chip mounting of claim 1 wherein the joint comprises at least two guided features and an arcuate path for the guided features defining a guideway, where the arcuate path includes at least one point having a curvature contributing to the definition of a pivot axis of the joint wherein:
   two or more of the guided features are separated from each other;
   two or more of the guided features share one or more constraint defined by the guideway;
   the motion involves pivoting of the chip in the plane with the guideway defining two or more curvatures at different sections; or
   the motion includes radial translation of the chip with respect to the axis of the centrifuge, during at least one part of the motion.

5. The microfluidic chip mounting of claim 1 wherein the joint is provided:
   on a blade of the centrifuge;
   as a coupler between the chip and the centrifuge blade; or
   on a mount between the chip and centrifuge blade.

6. The microfluidic chip mounting of claim 1 further comprising a lever, ratchet, or assembly of simple machines to limit a multiple degree of freedom joint to the one DoF joint, and/or to define the force applicator.

7. The microfluidic chip mounting of claim 1 wherein at one instant during the motion, a centre of mass of the chip part, the axis, and the instant centre of rotation, are not collinear in the projected plane, whereby a centripetal force on the chip part drives the motion, with a magnitude depending on a rotational rate of the centrifuge.

8. The microfluidic chip mounting of claim 1 wherein the force applicator comprises:
   a mechanical resistance;
   an elastic member; or
   a squiggle motor, or a motor based on piezoelectric, electroactive polymeric, shape memory alloy, or smart material assemblages, actuable independently of the centrifuge; or
   the chip mounting comprises two or more force applicators.

9. A swivel mounting kit for defining, once assembled, an articulated centrifugal blade for mounting a planar centrifugal microfluidic chip to a centrifuge, the articulated blade having:
   a blade part adapted for mounting to the centrifuge for rotation about the axis;
   a chip part for holding the chip to the swivel mount so that the chip's plane has its normal parallel to the centrifuge axis, in at least one pose of the chip part;
   a one degree of freedom (DoF) joint coupling the blade part and the chip part, the one DoF joint permitting the chip part to move with respect to the centrifuge blade, the motion including at least a 5° pivot projected onto the chip's plane, the motion having an instant centre of rotation separated from the centrifuge axis by a radial distance; and
   a force applicator bearing on the blade part or a rotary part of the centrifuge at a first end, and on the chip or chip part at a second end, the second end having a fixed set of one or more points for constraining the motion, where the fixed point(s) is/are not concentric with any instant centre of rotation in the chip's plane defined by the motion.

10. The kit according to claim 9 wherein the swivel mounting once assembled:
    allows the motion, which is substantially limited to a change in position and orientation of the microfluidic chip within the chip's plane;
    allows the motion, which is substantially limited to pivoting in the chip's plane;
    includes the one DoF joint which is an axial revolute joint, or at least a guideway comprising at least two guided features and an arcuate path for the guided features, the arcuate path including at least one point having a curvature contributing to the definition of a pivot axis of the joint;

includes the joint that is provided: on a blade of the centrifuge; as a coupler between the chip and the centrifuge blade; or on a mount between the chip and centrifuge blade;

further includes a lever, ratchet or assembly of simple machines to limit a multiple degree of freedom joint to a one DoF joint, and/or to define the force applicator;

allows the motion, which has, at one instant during the motion, a centre of mass of the chip part, the axis, and the instant centre of rotation, are not collinear in the chip's plane, whereby a centripetal force on the chip part drives the motion, with a magnitude depending on a rotational rate of the centrifuge; or includes one or more force applicator, each of which comprises:
a mechanical resistance;
an elastic member; or
a squiggle motor, or a motor based on piezoelectric, electroactive polymeric, shape memory alloy, or smart material assemblages, actuable independently of the centrifuge.

11. A method for controlling an angle of a centrifugal planar microfluidic chip in a plane swept by a centrifuge to which the chip is mounted, the method comprising:
providing a chip part mounted to a blade of a centrifuge by a one degree of freedom (DoF) joint so that a chip holder of the chip part is positioned at a radial distance from an axis of the centrifuge, to be swept in a plane of the centrifuge by rotation of the centrifuge about the axis;
mounting a force applicator to the blade and the chip part for constraining a motion of the chip part relative to the blade;
placing the chip in the chip holder of the centrifuge so that a center of mass of the chip part, and the axis, are not collinear with any instant centre of rotation of the one DoF joint projected in the plane; and
controlling a rate of centrifuge rotation to vary an instantaneous centripetal force on the chip part provided by the non-alignment of the centre of mass, axis, and instant centre of rotation.

12. The method of claim 11:
wherein the motion is:
substantially limited to a change in position and orientation of the microfluidic chip within the plane; or
substantially limited to pivoting in the plane;
wherein the one DoF joint:
is an axial revolute joint;
comprises at least two guided features and an arcuate path for the guided features defining a guideway, where the arcuate path includes at least one point having a curvature contributing to the definition of a pivot axis of the joint;
comprises the at least two guided features and the arcuate path for the guided features defining a guideway, wherein:
two or more of the guided features are separated from each other;
two or more of the guided features share one or more constraint defined by the guideway;
the motion involves pivoting of the chip in the plane with the guideway defining two or more curvatures at different sections; or
the motion includes radial translation of the chip with respect to the axis of the centrifuge, during at least one part of the motion;

is provided:
on a blade of the centrifuge;
as a coupler between the chip and the centrifuge blade; or
on a mount between the chip and centrifuge blade;
wherein the force applicator further comprises a lever, ratchet, or assembly of simple machines to limit a multiple degree of freedom joint to the one DOF joint, and/or to define the force applicator the one DoF joint;
wherein the chip is rectangular; the motion includes a set of instantaneous positions and orientations for which the length of the chip are generally aligned with the centrifuge blade, and a set of positions and orientations that are generally perpendicular to the centrifuge blade, and the most extended positions are generally perpendicular to the centrifuge blade;
or
wherein the force applicator comprises:
a mechanical resistance;
an elastic member; or
a squiggle motor, or a motor based on piezoelectric, electroactive polymeric, shape memory alloy, or smart material assemblages, actuable independently of the centrifuge.

13. A kit for forming an articulated microfluidic chip mounting, the kit comprising:
a blade part of, or for coupling to, a blade of a centrifuge, the blade adapted for mounting to the centrifuge for rotation about an axis of the centrifuge, and defining a plane of the centrifuge;
a chip part for holding a planar microfluidic chip;
a revolute joint for coupling the blade part and the chip, the revolute joint providing a joint axis at a radial distance from the axis, to permit the chip part to move with respect to the centrifuge blade, the motion including at least a 5° pivot projected onto the plane; and
a force applicator bearing on the blade part or a rotary part of the centrifuge at one end, and the chip or chip part at a second end, the bearing on the chip or chip part being provided at a fixed set of one or more points for constraining the motion, where the fixed point(s) is/are not concentric with, the joint axis.

14. The kit according to claim 13 assembled to form an articulated microfluidic chip mounting.

15. A kit for forming an articulated microfluidic chip mounting, the kit comprising:
a blade part of, or for coupling to, a blade of a centrifuge, the blade adapted for mounting to the centrifuge for rotation about an axis of the centrifuge, and defining a plane of the centrifuge;
a chip part for holding a planar microfluidic chip;
a one degree of freedom (DoF) joint for coupling the blade part and the chip part at a radial distance from the axis, the one DoF joint permitting the chip part to move with respect to the centrifuge blade, the motion including at least a 5° pivot projected onto the plane; and
one or more force applicators bearing on a fixed set of one or more points of the chip or chip part for controlling a rate of the motion defined by the one DoF joint, where the fixed point(s) is/are not concentric with any instant centre of rotation of the pivot motion in the plane, and once assembled, the chip part and the blade part are not coupled by any linkage other than via: the one DoF joint, and the one or more force applicators.

16. The kit according to claim 15 assembled to form an articulated microfluidic chip mounting.

17. A kit for forming an articulated microfluidic chip mounting, the kit comprising:
- a blade part of, or for coupling to, a blade of a centrifuge, the blade adapted for mounting to the centrifuge for rotation about an axis of the centrifuge, and defining a plane of the centrifuge;
- two chip parts for holding respective planar microfluidic chips;
- two revolute joints for coupling the blade part to each respective chip part to define joint axes, both at radial distances from the axis, the joints permitting the chip parts to move with respect to the centrifuge blade, the motions including at least a 5° pivot projected onto the plane; and one or more elastic members coupling the chip parts for controlling a rate of the motion defined by the revolute joint, where once assembled the chip parts and the blade part are not coupled by any linkage other than via: the revolute joints, and the elastic members.

18. The kit according to claim 17 assembled to form an articulated microfluidic chip mounting.

19. The kit according to claim 13:
wherein the motion is:
- substantially limited to a change in position and orientation of the microfluidic chip within the plane; or
- substantially limited to pivoting in the plane;

wherein the one DoF joint:
- is an axial revolute joint;
- comprises at least two guided features and an arcuate path for the guided features defining a guideway, where the arcuate path includes at least one point having a curvature contributing to the definition of a pivot axis of the joint;
- comprises the at least two guided features and the arcuate path for the guided features defining a guideway, wherein:
  - two or more of the guided features are separated from each other;
  - two or more of the guided features share one or more constraint defined by the guideway;
  - the motion involves pivoting of the chip in the plane with the guideway defining two or more curvatures at different sections; or
  - the motion includes radial translation of the chip with respect to the axis of the centrifuge, during at least one part of the motion;
- is provided:
  - on a blade of the centrifuge;
  - as a coupler between the chip and the centrifuge blade; or
  - on a mount between the chip and centrifuge blade;

wherein the force applicator further comprises a lever, ratchet, or assembly of simple machines to limit a multiple degree of freedom joint to the one DOF joint, and/or to define the force applicator the one DoF joint;
wherein the force applicator comprises:
- a mechanical resistance;
- an elastic member; or
- a squiggle motor, or a motor based on piezoelectric, electroactive polymeric, shape memory alloy, or smart material assemblages, actuable independently of the centrifuge or
wherein the kit comprises a plurality of the force applicators, at least two of the force applicators adapted to be mounted to the articulated microfluidic chip mounting concurrently.

20. The kit according to claim 15:
wherein the motion is:
- substantially limited to a change in position and orientation of the microfluidic chip within the plane; or
- substantially limited to pivoting in the plane;

wherein the one DoF joint:
- is an axial revolute joint;
- comprises at least two guided features and an arcuate path for the guided features defining a guideway, where the arcuate path includes at least one point having a curvature contributing to the definition of a pivot axis of the joint;
- comprises the at least two guided features and the arcuate path for the guided features defining a guideway, wherein:
  - two or more of the guided features are separated from each other;
  - two or more of the guided features share one or more constraint defined by the guideway;
  - the motion involves pivoting of the chip in the plane with the guideway defining two or more curvatures at different sections; or
  - the motion includes radial translation of the chip with respect to the axis of the centrifuge, during at least one part of the motion;
- is provided:
  - on a blade of the centrifuge;
  - as a coupler between the chip and the centrifuge blade; or
  - on a mount between the chip and centrifuge blade;

wherein the force applicator further comprises a lever, ratchet, or assembly of simple machines to limit a multiple degree of freedom joint to the one DOF joint, and/or to define the force applicator the one DoF joint;
wherein the chip is rectangular; the motion includes a set of instantaneous positions and orientations for which the length of the chip are generally aligned with the centrifuge blade, and a set of positions and orientations that are generally perpendicular to the centrifuge blade, and the most extended positions are generally perpendicular to the centrifuge blade;

or
wherein the force applicator comprises:
- a mechanical resistance;
- an elastic member; or
- a squiggle motor, or a motor based on piezoelectric, electroactive polymeric, shape memory alloy, or smart material assemblages, actuable independently of the centrifuge.

21. The kit according to claim 17:
wherein each of the motions is:
- substantially limited to a change in position and orientation of the microfluidic chip within the plane; or
- substantially limited to pivoting in the plane;

wherein the revolute joints are axial revolute joints, provided:
- on a blade of the centrifuge;
- as a coupler between the chip and the centrifuge blade; or
- on a mount between the chip and centrifuge blade;

wherein the force applicator further comprises a lever, ratchet, or assembly of simple machines to limit a multiple degree of freedom joint to the one DOF joint, and/or to define the force applicator the one DoF joint;

wherein the force applicator comprises:
- a mechanical resistance;
- an elastic member; or
- a squiggle motor, or a motor based on piezoelectric, electroactive polymeric, shape memory alloy, or smart material assemblages, actuable independently of the centrifuge.

\* \* \* \* \*